United States Patent
Fleck et al.

(10) Patent No.: US 8,253,697 B2
(45) Date of Patent: Aug. 28, 2012

(54) HEIGHT DEPENDENT FILTER FOR A POINTING DEVICE OR A DIGITIZER TABLET, A METHOD OF REDUCING JITTER IN POSITION DATA OF A POINTING DEVICE OR A DIGITIZER TABLET, A COMPUTER READABLE MEDIUM AND DRIVER FOR PERFORMING THE METHOD

(75) Inventors: David Fleck, Vancouver, WA (US); V. Thane Norton, III, Portland, OR (US)

(73) Assignee: Wacom Co., Ltd, Saitama-Ken (JP)

( * ) Notice: Subject to any disclaimer, the term of this patent is extended or adjusted under 35 U.S.C. 154(b) by 1371 days.

(21) Appl. No.: 11/902,923

(22) Filed: Sep. 26, 2007

(65) Prior Publication Data
US 2009/0078474 A1    Mar. 26, 2009

(51) Int. Cl.
*G09G 5/00*    (2006.01)
(52) U.S. Cl. ..... 345/173; 345/174; 345/179; 178/18.01; 178/19.01
(58) Field of Classification Search .................. 345/156, 345/173–179; 178/18.01–18.09
See application file for complete search history.

(56) References Cited

U.S. PATENT DOCUMENTS

| | | | | |
|---|---|---|---|---|
| 5,179,254 A * | 1/1993 | McDermott | | 178/18.02 |
| 5,225,637 A | 7/1993 | Rodgers et al. | | |
| 5,341,155 A * | 8/1994 | Elrod et al. | | 345/179 |
| 5,831,600 A * | 11/1998 | Inoue et al. | | 345/173 |
| 7,932,896 B2 * | 4/2011 | Westerman | | 345/173 |
| 2003/0122786 A1 * | 7/2003 | Chao et al. | | 345/173 |

\* cited by examiner

*Primary Examiner* — Quan-Zhen Wang
*Assistant Examiner* — Jennifer Nguyen
(74) *Attorney, Agent, or Firm* — Berenato & White, LLC

(57) ABSTRACT

A height dependent filter for a pointing device or digitizer tablet, a method of reducing jitter in position data of a pointing device, and a computer readable medium are provided. A method of stabilizing positional data in a digitizer tablet associated with a display device for reporting a position of a pointer includes detecting a current location of the pointer with respect to a coordinate grid defined on the tablet and outputting a position signal indicative of the current pointer location. Noise is filtered from the position signal based on at least one filter parameter. A distance between the pointer and a point on the tablet is determined, and an amount of jitter in the position signal is determined based on the determined distance. The at least one filter parameter is adjusted based on the estimated amount of jitter.

24 Claims, 6 Drawing Sheets

HEIGHT DEPENDENT FILTER FOR A POINTING DEVICE OR A DIGITIZER TABLET, A METHOD OF REDUCING JITTER IN POSITION DATA OF A POINTING DEVICE OR A DIGITIZER TABLET, A COMPUTER READABLE MEDIUM AND DRIVER FOR PERFORMING THE METHOD

FIELD OF THE INVENTION

The present invention relates to a method and apparatus for stabilizing coordinates measured and output by a pointing device or digitizer tablet, a pointing device or digitizer tablet including the apparatus, and a computer readable medium and driver for performing the method. The present invention also relates to a height dependent filter usable to reduce jitter in a pointing device or digitizer tablet.

BACKGROUND OF THE INVENTION

Pointing devices are computer peripherals used for drawing or navigating on a computer system. They consist of a flat sensing area and an associated pointer. They can be in the form of a graphics tablets, comprised of a sensing tablet and a pointing tool that is usually either pen shaped or mouse shaped. Graphics tablets measure X and Y coordinate positions of the tool as well as other parameters, such as pen tip pressure, pen tilt angle, pen axial rotation, mouse buttons, mouse rotation, etc. A user manipulates the tool over the tablet surface for tracing, drawing, writing, manipulating graphical data, or navigating in a graphical user interface. The tablet is usually attached to a host computer and the graphical data is displayed either on a separate display or one integral with the computer.

Another form of pointing device is a touch tablet. A touch tablet has a surface that is sensitive to being touched by a user's finger, which acts as the pointing tool. The touch tablet measures X and Y coordinate positions, contact with the user's finger, and other parameters such as contact area. The user touches the surface of the touch tablet, usually placed in front of a display, to select or manipulate objects on the display.

Various underlying technologies can be used for detecting the pointing device or tool position in graphics tablets. One common technology is electromagnetic, where the position of the tool is detected by interpolating signal strength across a series of sensing coils in the tablet. Another technology is electrostatic, where the position of the tool is detected by interpolating signal strength across a series of electrodes in the tablet. Touch tablets can use capacitive coupling between the user's finger and the tablet to detect finger position. Here, the position of the user's finger can be interpolated from signal levels at electrodes at the edges of the tablet, or between a series of electrodes located in the tablet. An electric field created by the electrodes can extend above the surface of the tablet to allow measurement of the coordinates above the surface. The detection, interpolation, and transmission of the resulting coordinate position is preformed in real-time so that the user can observe his or her actions on the computer monitor or display device.

Since the detection of the signal strength at the electrodes of the touch tablet or at the coils of the graphics tablet requires measuring the amplitude of an analog signal, the signal is susceptible to interference or noise from external sources. This noise manifests itself as instability in measured coordinate positions and is known as jitter. Jitter has a fairly random distribution usually with Gaussian properties and a predictable range for any given environment, but is unpredictable from sample to sample.

Jitter has a time scale that is the same as the time scale of the sampling, which is generally around 100-200 Hz. Since user movements are generally on a time scale of less than 20 Hz, a variety of low-pass filters can be used to separate the two signals, that is, the coordinate position signal from the noise or interference created by the external sources. However, significant effort must be taken to avoid introducing filtering artifacts. Filtering artifacts occur when the low pass filtering removes high frequency content from the position signal which actually represents valid user input data.

SUMMARY OF THE INVENTION

A method of reducing jitter over a range of tool heights above a surface of a pointing device is provided. The method includes determining the height of a tool above a tablet surface and adjusting parameters of a jitter reduction filter based on the determined height. The position of the tool on the tablet surface is measured, and the adjusted jitter reduction filter is then applied to filter the measured position of the tool. Then, the filtered position is reported.

A method of stabilizing positional data in a digitizer tablet associated with a display device for reporting a position of a pointer is also provided. The method includes detecting a current location of the pointer with respect to a coordinate grid defined on the tablet and outputting a position signal indicative of the current pointer location. Noise is filtered from the position signal based on at least one filter parameter. The distance of the pointer from a point on the tablet is determined, and an amount of jitter in the position signal is estimated based on the determined distance. The at least one filter parameter is adjusted based on the estimated amount of jitter.

A digitizer tablet for digitizing a position of a pointer is also provided. The digitizer tablet is associated with a display device for reporting the position of the pointer. A position detecting unit defines a coordinate grid on a surface of the tablet, and includes at least one sensing element for detecting a current location of the pointer with respect to the coordinate grid. The position detecting unit then outputs a position signal indicative of the current pointer location. A filtering unit filters noise from the position signal based on at least one filter parameter. A jitter determining unit determines a distance of the pointer from a point on the tablet and estimates an amount of jitter in the position signal based on the determined distance. A filter parameter adjustment unit adjusts the at least one filter parameter of the filtering unit based on the amount of jitter estimated by the jitter determining unit.

An apparatus for stabilizing positional data in a digitizer system having a tablet for sensing a position indicating signal received from a pointer and for generating a positional data signal indicative of a position of the pointer in response to the position indicating signal is also provided. The apparatus includes a jitter estimation unit for estimating jitter by determining a signal to noise ratio (SNR) of the position indicating signal received from the pointer at the tablet, and a filter unit for filtering the positional data signal generated by the tablet. The filter unit applies a first filter when the SNR is determined to be large and applies a second filter when the SNR is small.

A computer readable medium that performs the above-described methods is also provided.

A system driver associated with a tablet pointing device is also provided. The system driver contains executable instructions for instructing a computer to interact with the tablet pointing device. The executable instructions contained by the system driver include a method of stabilizing positional data in the tablet pointing device.

DETAILED DESCRIPTION OF THE INVENTION

Reference will now be made in detail to the embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification.

Figure 1:
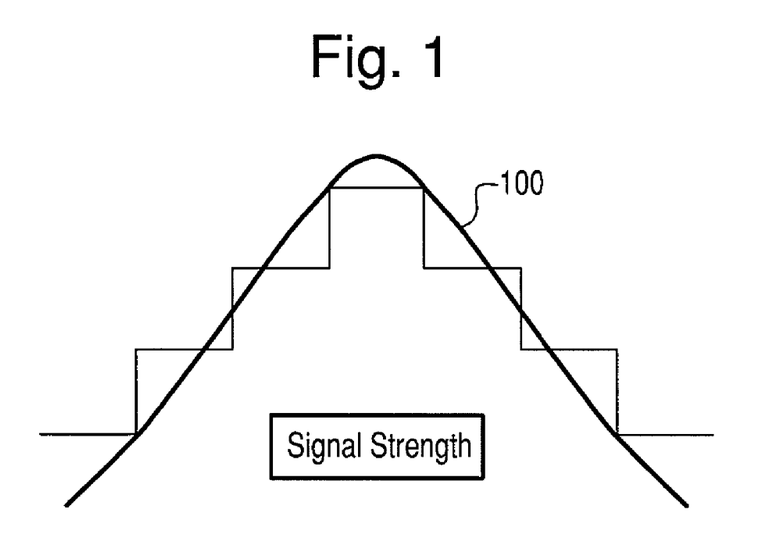
FIG. 1 is a signal diagram illustrating a signal received by a series of sensing elements, e.g., coils or electrodes, at a tablet surface when a pointer is disposed at the tablet surface.
Figure 2:
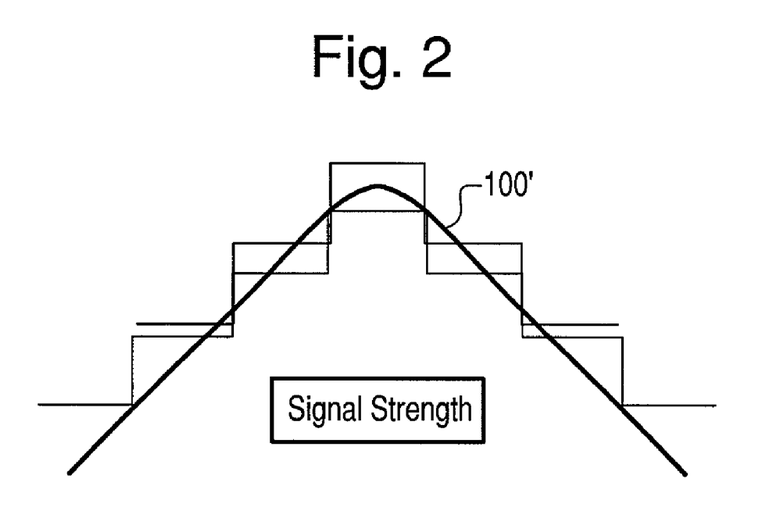
FIG. 2 is a signal diagram illustrating a decrease in signal strength that occurs when the pointer is a small distance above the tablet surface.

As best shown by comparison of FIGS. 1 and 2, an analog electromagnetic signal 100 received by a tablet 102 (see FIGS. 3A and 3B) when a pointer 104 is disposed at a tablet surface 106 is stronger than a signal 100' received by the tablet 102 when the pointer 104 is moved away from the tablet surface 106. Due to interference introduced by components surrounding the tablet 102, the signal-to-noise ratio (SNR) decreases as the pointer 104 is moved away from the tablet 102. Accordingly, adaptive filtering of the interference from a position signal detected by the tablet 102 can be preformed based on different SNRs so as to minimize the introduction of filtering artifacts or distortion.

Figure 3A:
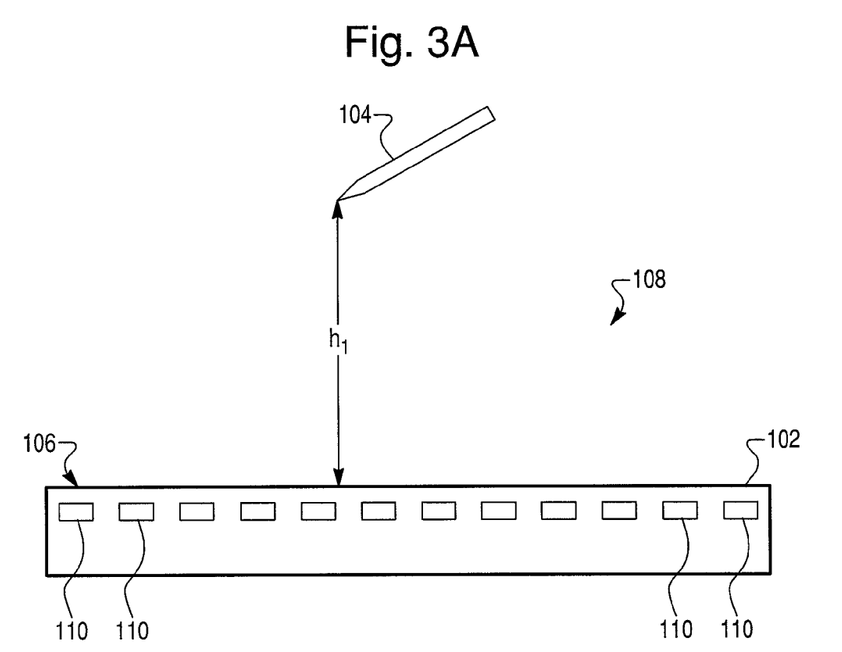
FIGS. 3A and 3B are elevational side views of the pointer at different heights from the tablet surface.
Figure 3B:
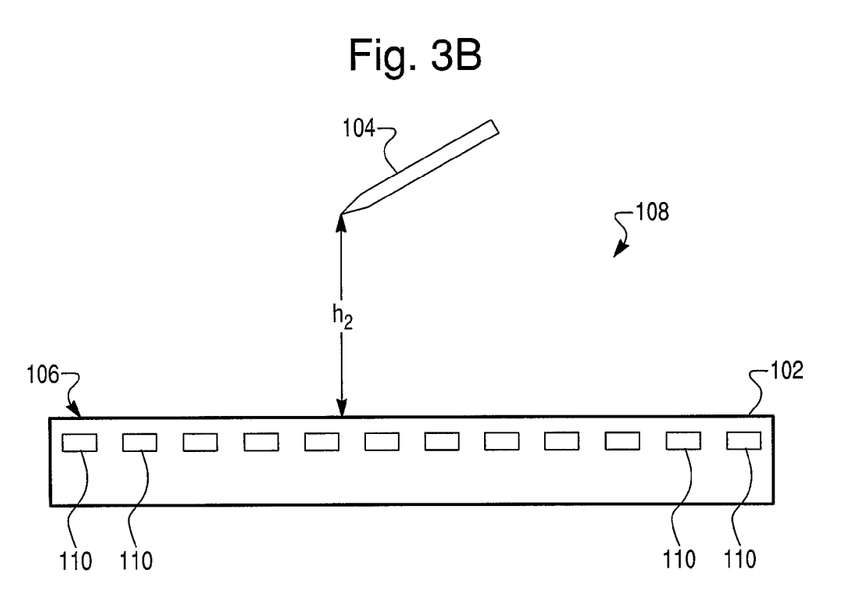

As best shown in FIGS. 3A and 3B, a pointer device 108 includes the pointer 104 and the tablet 102 including a plurality of sensing elements 110 disposed below the tablet surface 106 for measuring the position of the pointer 104 with respect to the tablet surface 106. For example, the sensing elements 110 may be inductive coils or capacitive sensors as in a graphics tablet or a touch tablet.

Figure 4:
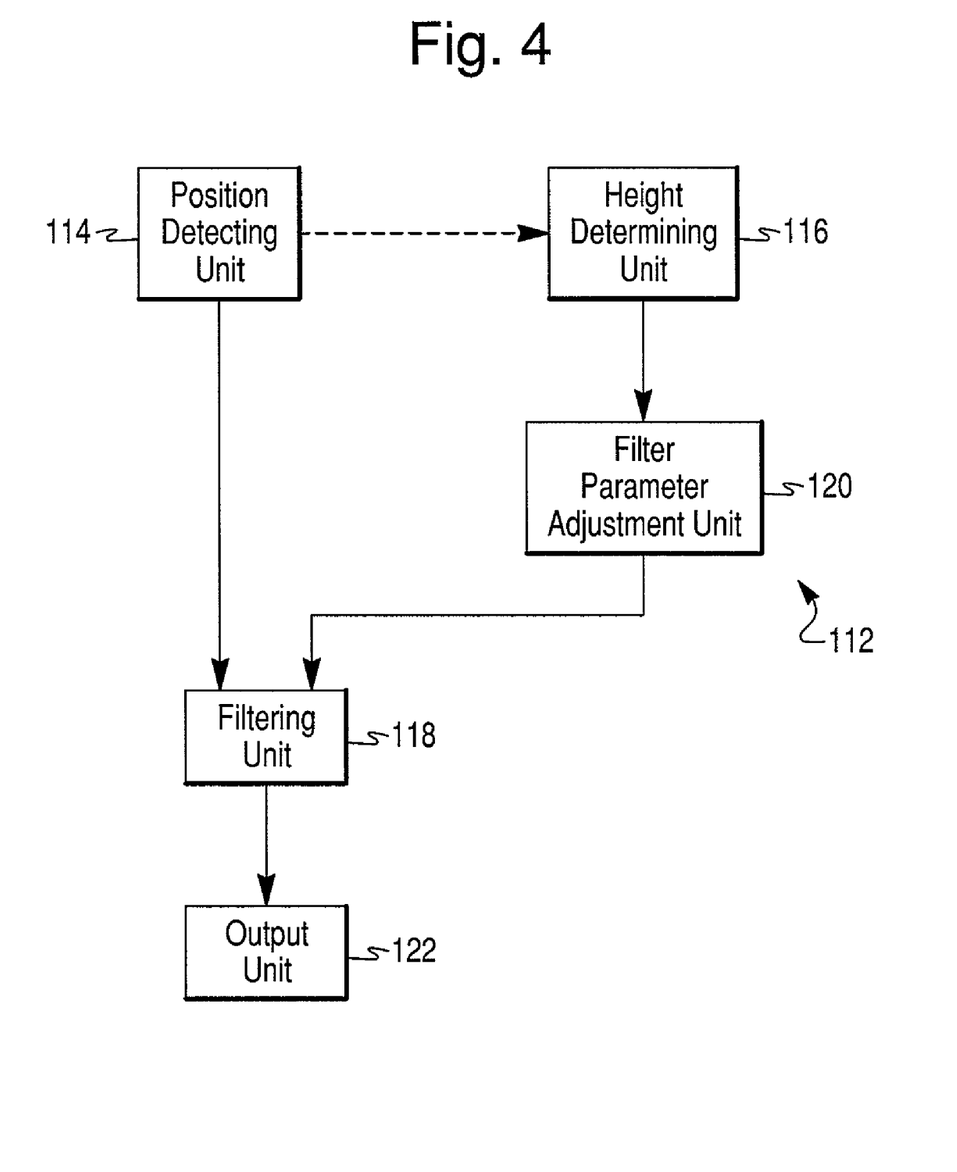
FIG. 4 is a block diagram illustrating an apparatus for reducing jitter in position data measured and output by a pointer device according to an embodiment of the present invention.

As best shown in FIG. 4, an apparatus 112 for reducing jitter in position data measured and output by the pointer device 108 (see FIGS. 3A and 3B) includes a position detecting unit 114, a height determining unit 116, a filtering unit 118, a filter parameter adjustment unit 120, and an output unit 122.

The position detecting unit 114 detects the position of the pointer 104 with respect to a coordinate system defined on the tablet surface 106 by sensing elements 110 of the pointer device 108 shown in FIGS. 3A and 3B. The position detecting unit 114 detects an analog position indicating signal received from the pointer 104, samples the position indicating signal, and determines the location of the pointer 104 at each sample based on the value of the sampled position indicating signal.

The output unit 122 displays a coordinate position of the pointer 104 along the tablet surface 106. The output unit 122 may be a computer monitor or screen that reports position of the pointer 104 to a user in real-time using a cursor.

The height determining unit 116 determines the current height of the pointer 104 from the tablet surface 106 either independently of the position detecting unit 114 or based on an input received from the position detecting unit 114. For example, when the height determining unit 116 is independent of the position detecting unit 114, an independent electromagnetic or electrostatic interaction with the pointer 104 is generated by the height determining unit 116 using a predefined electromagnetic or electrostatic field. To this end, one or more auxiliary electrodes or sensor coils (not shown) are disposed on the tablet 102 for sensing the interaction with the pointer 104 to determine the height of the pointer 104 with respect to the tablet surface 106.

Alternatively, the height determining unit 116 may detect the height of the pointer 104 based on an input received from the position detecting unit 114. For example, the height determining unit 116 may store a table of heights associated with a plurality of detected signal strength values. Thus, when the signal strength is determined by the position detecting unit 114 as part of the X-Y position determination, the height determining unit 116 may look up the signal strength provided by the position detecting unit 114 and determine the corresponding height as the current height of the pointer 104 above the tablet surface 106.

The height determining unit 116 may alternatively be a noise estimation unit, an SNR estimation unit, or a jitter estimation unit that estimates the SNR of the signal received from the pointer 104 or the jitter in the position data.

The dashed line in FIG. 4 represents communication between the height determining unit 116 and the position detecting unit 114 in an embodiment in which the height determining unit 116 determines the height of the pointer 104 based on an input from the position detecting unit 114. In this case, the signal strength of the position indicating signal transmitted by the pointer 104 and sensed by the sensing elements 110 may be used to determine the height of the pointer 104, for example, in accordance with the signal diagrams of FIGS. 1 and 2.

In another embodiment of the present invention, the height determining unit 116 may include a spatial capacitive overlay disposed on the tablet surface 106, which projects an energy field and recognizes movement as the projected energy field is penetrated by the pointer 104. In this case, the height determining unit 116 can discern between a hand, arm, or other object and can track movement within the field to interpret the intention of the user. Accordingly, by tracking the movement within the projected field, the height determining unit 116 can determine the height of the pointer 104 with respect to the tablet 102 independently of the measurement conducted by the position detecting unit 114. The spatial capacitive overlay may be a system previously available from TouchKO or available from the assignee hereof. The spatial capacitive overlay system may be the system described in U.S. patent application Ser. No. 11/211,272, the entire disclosure of which is incorporated herein by reference.

The filtering unit 118 filters the position signal values output from the position detecting unit 114 to remove the effect of interference, thereby reducing jitter based on one or more filter parameters, such as filter depth or window size. The filtering unit 118 may include a low-pass filter for removing high frequency interference introduced by components surrounding the tablet 102.

The filter parameters of the filtering unit 118 are adjusted by the filter parameter adjustment unit 120 based on the height of the pointer 104 determined by the height determining unit 116. In an embodiment in which the height determining unit 116 is the SNR or jitter estimation unit, the filter parameter adjustment unit 120 may adjust the filter parameters based on the estimated SNR of the position indicating signal received by the position detecting unit 114 or the estimated jitter in the position signal values determined by the position detecting unit 114.

The low-pass filter is a moving average or rectangular windowing filter. With this type of filter, the last N coordinate positions are averaged, where N is a small number such as four. The larger the value of N, the more high frequency data is filtered out, and the more jitter is decreased. However, also encoded with this high frequency data is any abrupt change in direction of the pointer 104. Thus, as N is increased, the filtering artifacts resulting from smoothing abrupt changes in pointer direction become more pronounced. An example of this artifact is that a sharp right angle made with the pointer 104 rounds into a gentle curve. This causes distortion of drawn figures, such as the letter L or an image of a rectangle. Also, the coordinate position presented by the output unit 122 tends to lag behind the actual position of the pointer 104, that lag being on the order of N divided by twice the frequency. For example, with an N of 4 and a sampling frequency of 100 Hz, the lag is approximately $\frac{1}{50}^{th}$ of a second. If N is increased to 8, the lag increases to $\frac{1}{25}^{th}$ of a second. While most people find $\frac{1}{50}^{th}$ of a second of lag to be unnoticeable, they also find $\frac{1}{25}^{th}$ of a second of lag to be unacceptable.

Although the noise in the measured position indicating signal tends to come from sources away from the tablet 102 and tends to fluctuate randomly from sample to sample, the noise fluctuations can be averaged in order to approximate the noise level over time as being relatively constant. On the other hand, the desired position indicating signal received from the pointer 104 at the tablet 102 decreases in strength as the distance of the pointer 104 from the tablet 102 increases due to signal attenuation. It can be seen in FIGS. 1 and 2 that in the detected position indicating signal, the SNR decreases as the distance of the pointer 104 from the tablet 102 increases. When the SNR decreases, the influence of noise on the detection of the position indicating signal also increases. This leads to increased jitter as the pointer 104 moves further from the tablet surface 106. This can be a problem if the user is tracing through thick material, such as a magazine, causing the pointer 104 to be further from the surface 106. This can also become a problem if the user desires to leave a screen cursor at a particular location on the monitor as they move the pointer 104 out of a sensing range of the tablet 102.

In view of these concerns, the filter parameter adjustment unit 120 best shown in FIG. 4 adjusts one or more filter parameters, such as filter depth or window size, of the filtering unit 118 to minimize the amount of jitter in the position signal values while reducing the amount of artifacts and filter distortion introduced by the filtering unit 118 based on the height of the pointer 104 detected by the height determining unit 116. Here, the height of the pointer 104 is used to approximate the jitter. Based on the height of the pointer 104 or the approximated jitter, the filter period N of the filtering unit 118 is adjusted to account for more or less jitter. The filter period N is increased when there is more jitter and decreased when there is less jitter. The filter period N is also referred to as the filter depth of the filtering unit 118. The filter period N may be initially set based on sensing characteristics of the pointing device 108.

In an exemplary embodiment of the present invention, the filter period N may be initially set to 4 when the pointer 104 is in contact with the tablet surface 106. Thus, as the distance between the pointer 104 and the tablet surface 106 increases, the filter period N may be increased up to N=8. Accordingly, the filter period N may be varied between 4 and 8 based on the height of the pointer 104. The manner and amount by which the filter period N is adjusted is further described in detail below.

When the pointer 104 is close to or in contact with the tablet surface 106, there is less jitter in the position signal values due to a greater SNR, therefore less high frequency content is filtered from the position signal. In this case, high frequency content that is an actual valid reading of movement of the pointer 104 on the tablet surface 106, for example sharp angles and abrupt movements, is not removed from the position signal by filtering.

On the other hand, when the pointer 104 is further from the tablet surface 106, there is more jitter in the position signal values due to a decreased SNR, therefore more high frequency content is filtered from the position signal. In this case, jitter is reduced at the expense of filtering from the position signal some high frequency content indicating movement of the pointer 104, as opposed to noise. Thus, referring to the rectangular windowing filter mentioned above, when the pointer 104 is moved away from the tablet surface 106 and the signal-to-noise ratio (SNR) decreases, the period N of the filtering unit 118 is increased to increase the filter window size, thereby removing more high frequency content containing most of the noise from the position signal value, reducing the jitter, and increasing the SNR. On the other hand, when the pointer 104 is moved toward the tablet surface 106 and the SNR increases, the value of N is decreased to decrease the filter window size, thereby removing less of the high frequency content from the position signal value and decreasing the amount of distortion or filtering artifact introduced by the filtering unit 118.

Accordingly, the filtering unit 118 filters the position signal values received from the position detecting unit 114 and provides the filtered position signal values to the output unit 122.

Figure 5:
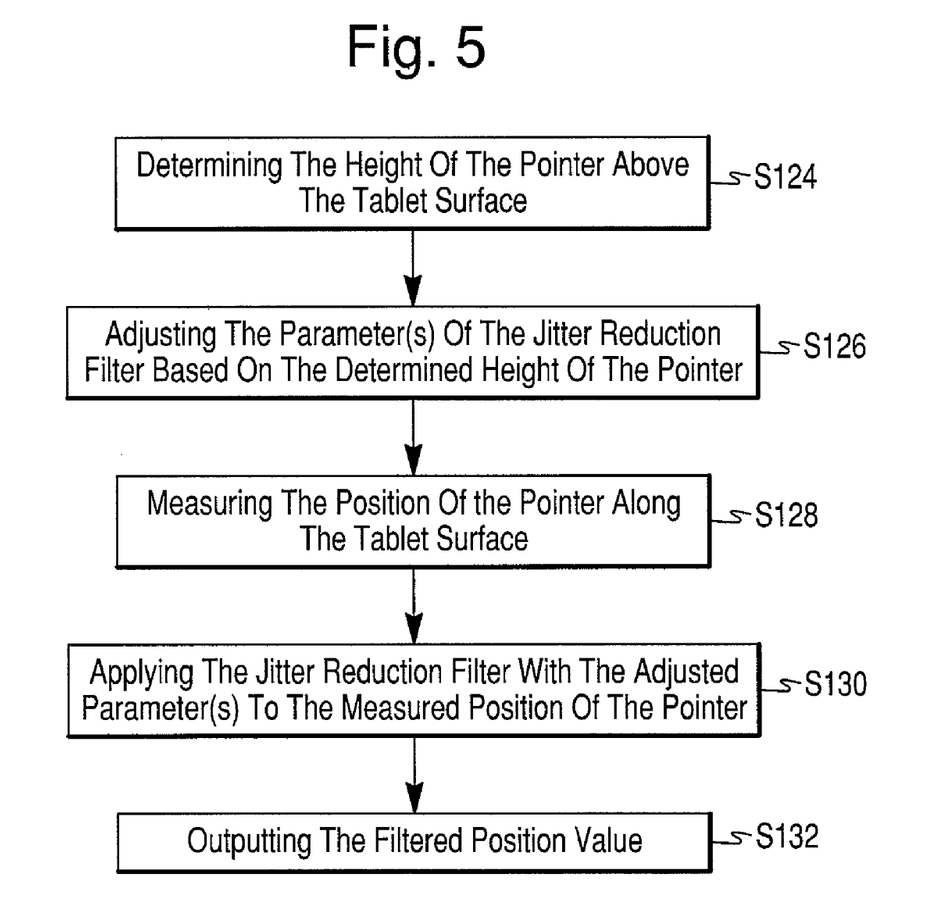
FIG. 5 is a flowchart diagram illustrating a method of reducing jitter in position data measured and output by a pointer device according to another embodiment of the present invention.

As best shown in FIG. 5, a method of reducing jitter in position data measured and output by the pointer device 108 includes determining the height of the pointer 104 above the tablet surface 106 at step S124. Then, at step S126, the parameter(s) of the jitter reduction filter, such as the filtering unit 116 shown in FIG. 4, are adjusted based on the height determined in step S124. In step S126, the window size, period N, or the "depth" of the filtering unit 116 can be adjusted based on the height of the pointer 104 above the tablet surface 114. In step S128, the position or position value of the pointer 104 along the coordinates of the tablet surface 106 is measured using the sensing elements 110 of the tablet 102 shown in FIGS. 3A and 3B. At step S130, the measured position signal value is filtered by the jitter reduction filter using the parameters adjusted at step S126. The filtered position signal value is then output to a display device or other position reporting mechanism at step S132 to indicate to a user the position of a cursor in real-time.

Figure 6A:
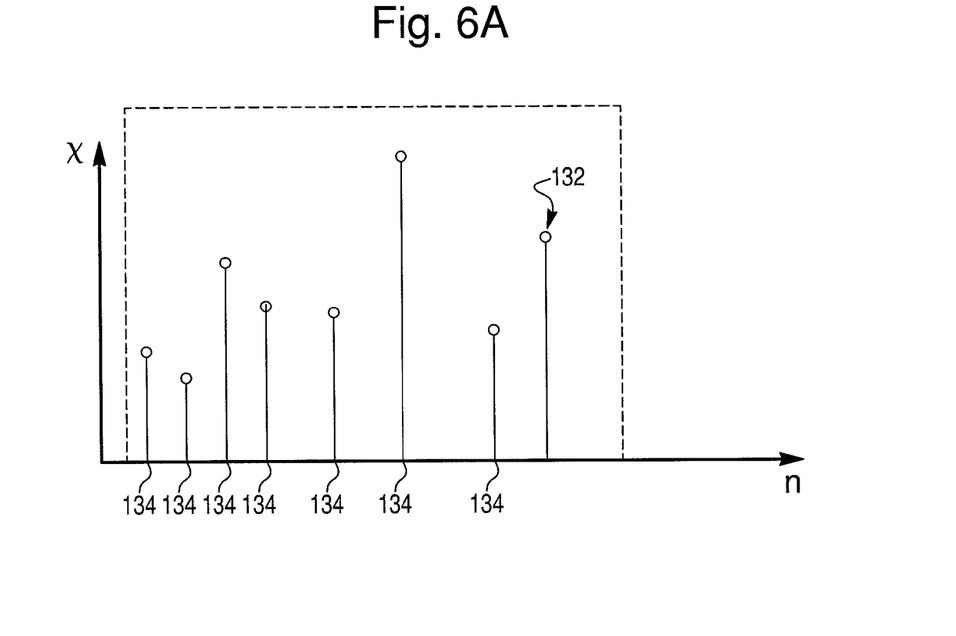
FIGS. 6A and 6B are signal diagrams illustrating an exemplary filtering operation performed when the pointer is at the different heights from the tablet surface as shown in FIGS. 3A and 3B, respectively.
Figure 6B:
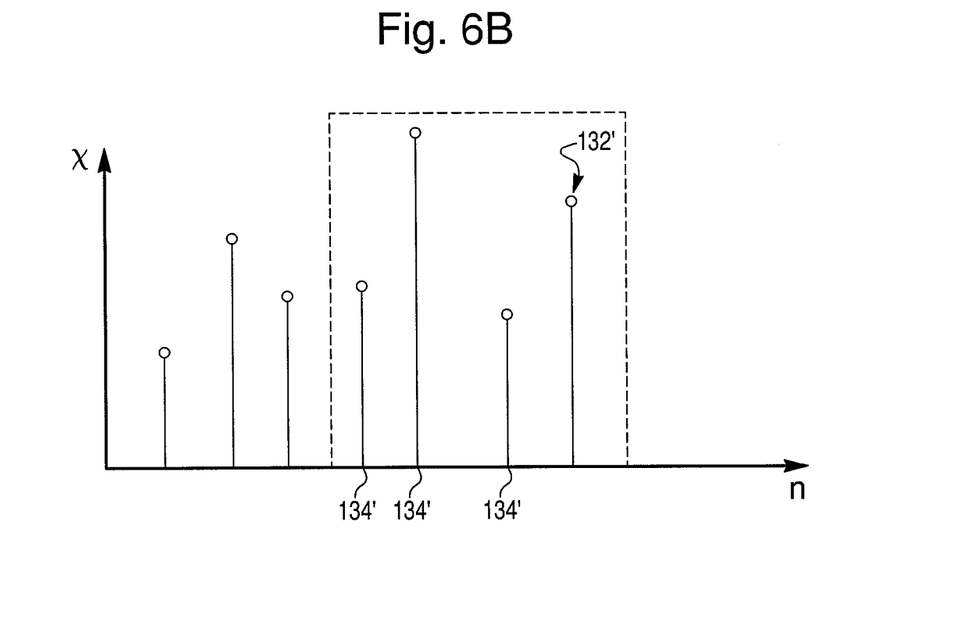

FIGS. 6A and 6B illustrate an exemplary operation of the present embodiment of the invention. Specifically, FIG. 6A illustrates a rectangular windowing filter being applied when the pointer 104 is at height ($h_1$) from the tablet surface 106 as shown in FIG. 3A, while FIG. 6B shows the rectangular windowing filter being applied when the pointer 104 is at height ($h_2$) from the tablet surface 106 as shown in FIG. 3B. The filter shown in FIG. 6A is applied with a period of N=8 so that a current position value 132 is averaged with the previous N−1 (7) position values 134. When the filter period N=8, more high frequency content is removed from the position values than when the filter period N=4 due to the fact that any variation in the current position value 132 is averaged with the seven previous position values 134. The filter shown in FIG. 6B is applied with a period of N=4 so that a current position value 132' is averaged with the previous N−1 (3) position values 134'. When the filter period N=4, less high frequency content is removed from the position values than when the filter period N=8 due to the fact that any variation in the current position value 132' is only averaged with the three previous position values 134'. The window size/filter depth of the filter shown in FIGS. 6A and 6B is represented by a dashed line. Accordingly, the filter depth of the filter can be varied based on the relative height or estimated jitter differences. It should be understood that the positional signal diagrams of FIGS. 6A and 6B are exemplary and are not intended to limit the scope of the present invention. The filter period N, which can also be referred to as the filter depth (d), may be set to other integers. Although FIGS. 6A and 6B only show the position values along the X-axis, it should be understood that Y-axis position values can be filtered in the same manner.

The following is an exemplary derivation of a height adaptive filter equation that may be used in the above jitter reducing apparatus 112 of FIG. 4 or the jitter reducing method of FIG. 5. The parameter of the rectangular windowing filter can be derived as follows. For the purpose of this derivation, the relative height of the pointer 104 need only be considered, so the actual height from the tablet 102 is immaterial. Therefore, to make subsequent calculations simpler, we normalize the height, defining the height at which the pointer 104 touches the tablet 102 as the minimum height ($h_0$) and giving the minimum height a value of 0. Similarly, we define the maximum height ($h_1$) as the height at which data can no longer be consistently read from the tablet and give it a value of 1. The measured (or calculated) jitter at $h_0$ is designated as $j_0$, while the measured (or calculated) jitter at $h_1$ is designated as $j_1$.

Now, for the tablet 102, we define a relationship between the height h and the jitter j. For a typical relationship we can use a simple linear interpolation:

$$j_h = (j_1 - j_0)\frac{h - h_0}{h_1 - h_0} + j_0 \quad \text{[Equation 1]}$$

$$j_h = (j_1 - j_0)\frac{h - 0}{1 - 0} + j_0$$

$$j_h = (j_1 - j_0)h + j_0$$

For the purposes of calculating the period of the filter N, the absolute value of the jitter is not important. Only the expected increase in the jitter is important. Thus, we can simplify Equation 1 by dividing by $j_0$ and getting a relative jitter $r_h$.

$$r_h = \frac{j_h}{j_0} \quad \text{[Equation 2]}$$

$$r_h = \frac{(j_1 - j_0)h + j_0}{j_0}$$

$$r_h = \left(\frac{j_1}{j_0} - 1\right)h + 1$$

Because signal sensing characteristics for any given tablet are constant, the jitter $j_0$ at the tablet surface $h_0$ is a constant and the jitter $j_1$ at the maximum height $h_1$ is also constant. Thus, it should be noted that the term ($j_1/j_0-1$) is also constant for any particular tablet. When we define this value to be K, we get:

$$r_h = K \cdot h + 1 \quad \text{[Equation 3]}$$

Now, for any set of tablets and associated pointers there are particular jitter qualities and a particular sampling frequency, which can be used to determine an ideal low-pass filter, such as a rectangular windowing filter. As described above, a rectangular windowing filter for some coordinate x and with a depth of d will determine the $n^{th}$ value of the filtered coordinate x' using the following formula:

$$x'_n = \sum_{i=0}^{d-1}\left(\frac{x_{n-i}}{d}\right) \quad \text{[Equation 4]}$$

Now, given the signal sensing characteristics of the tablet 102, a basic depth $d_0$ of the afore-mentioned filtering unit 118 on the surface 106 of the tablet 102 (at $h_0$) can be selected to reduce jitter at the surface 106 ($j_0$) to unnoticeable levels without presenting filtering artifacts.

There are a number of options available to customize the filter depth parameter. The filter depth can be scaled linearly in discrete integer quantities with tablet jitter. Rounding can be used to achieve these discrete integer changes in filter depth. For example, a ceiling function, a floor function, or the like may be used to round to the nearest integer. The ceiling function returns the smallest integer that is greater than or equal to a real number, and the floor function returns the largest integer that is less than or equal to a real number. For explanation purposes, a floor function is used. Using Equation 2 for relative jitter, we derive the depth formula:

$$d_h = \lfloor d_0 \cdot r_h \rfloor \quad \text{[Equation 5]}$$

Substituting for $r_h$ from Equation 3 above, the following formula is derived:

$$d_h = \lfloor d_0 \cdot (K \cdot h + 1) \rfloor \quad \text{[Equation 6]}$$

Then, using the new height variable depth $d_h$ in the afore-mentioned rectangular windowing filter, we obtain the following height-adaptive rectangular windowing filter:

$$x'_n = \sum_{i=0}^{d_h-1}\left(\frac{x_{n-i}}{d_h}\right) \quad \text{[Equation 7]}$$

$$x'_n = \sum_{i=0}^{\lfloor d_0 \cdot (K \cdot h+1)\rfloor-1}\left(\frac{x_{n-i}}{\lfloor d_0 \cdot (K \cdot h + 1)\rfloor}\right)$$

In light of Equation 7 for the height-adaptive rectangular windowing filter, there are a number of factors that can be considered to improve performance of the filtering unit 118.

Growing the filter by one sample, or increasing the filter depth by one, makes the lag of the resulting coordinate one-half sample greater than the previous filter window. Similarly, if the filter depth is decreased by one, the lag of the resulting coordinate is one half sample less than that of the previous filter window. If the lag is increased or decreased dramatically, unexpected dramatic changes may result in the value of x', which represents the filtered position signal value(s). Thus, to prevent these dramatic changes, the method shown in FIG. 7 may be used to gradually increase or decrease the filter depth in accordance with the change in height of the pointer 104.

Figure 7:
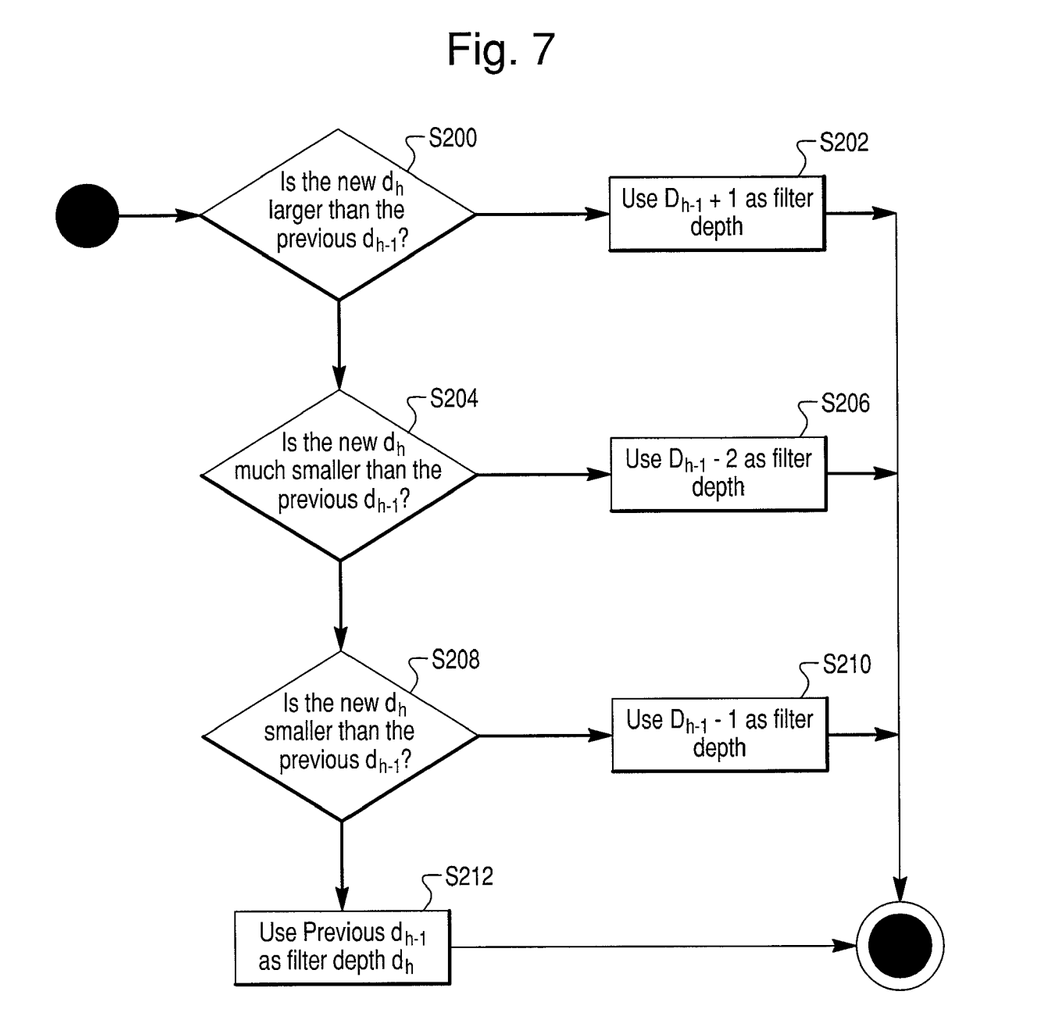
FIG. 7 is a flowchart diagram illustrating a method of adjusting a parameter of a jitter reduction filter according to yet another embodiment of the present invention.

The method of FIG. 7 spreads the increases in filter depth over a number of samples equal to the size of the change. In other words, the increases in filter depth are made gradual by the method of FIG. 7 by increasing the filter depth by 1 for each sample until the proper filter depth is obtained. For example, if the pointer 104 is suddenly moved from the tablet surface 106 away from the tablet 102, rather than suddenly increasing the filter depth by a relatively large number, for example 4, for the current sample according to Equation 7, the increase in filter depth is performed over more than one sample, as prescribed by the method of FIG. 7. As a result, the manner in which the position values are filtered does not change dramatically from sample to sample.

Reductions in filter depth may be handled in a similar manner. That is, the method of FIG. 7 may also be used to make relatively large reductions in filter depth gradually. For changes that would be dramatic, the filter depth change is spread out over approximately half the number of samples. It should be noted that the method of FIG. 7 may correspond to step S126 of the method shown in FIG. 5. The method of FIG. 7 is performed once at each sample to determine the proper adjustment of the filter depth.

Referring to FIG. 7, at step S200, it is determined whether the new or proposed filter depth ($d_n$) is larger than the previous filter depth ($d_{h-1}$). If it is determined in step S200 that the new filter depth ($d_n$) is larger than the previous filter depth ($d_{h-1}$), then a filter depth that is one larger than the previous filter depth ($d_{h-1}$) is used in the filtering operation performed by the filtering unit 118 at step S202.

On the other hand, if it is determined that the new filter depth ($d_n$) is not larger than the previous filter depth ($d_{h-1}$) at step S200, then S204 is performed to determine whether the new filter depth ($d_n$) is much smaller than the previous filter depth ($d_{h-1}$). If it is determined in step S204 that the new filter depth ($d_n$) is much smaller than the previous filter depth ($d_{h-1}$), step S206 is performed to use a filter depth that is two smaller than the previous filter depth ($d_{h-1}$). A threshold value may be used to determine whether the new filter depth ($d_n$) is much smaller (or larger) than the previous filter depth ($d_{h-1}$). For example, the difference between the new or proposed filter depth ($d_n$) and the previous filter depth ($d_{h-1}$) may be calculated and then compared to the threshold value. If the calculated difference is larger than the threshold value, the new filter depth ($d_n$) is determined to be much smaller than the previous filter depth ($d_{h-1}$). Similarly, if the calculated difference is less than or equal to the threshold value, the new filter depth ($d_n$) is determined not to be much smaller than the previous filter depth ($d_{h-1}$).

If it is determined in step S204 that the new filter depth ($d_n$) is not much smaller than the previous filter depth ($d_{h-1}$), it is determined at S208 whether the new filter depth ($d_n$) is smaller than the previous filter depth ($d_{h-1}$). If the new filter depth ($d_n$) is determined to be smaller than the previous filter depth ($d_{h-1}$) at step S208, step S210 is performed to use a filter depth that is one smaller than the previous filter depth ($d_{h-1}$).

If it is determined that the new filter depth ($d_n$) is not smaller than the previous filter depth ($d_{h-1}$) at steps S204 and S208, then step S212 is performed to use a filter depth that is equal to the previous filter depth ($d_{h-1}$).

The threshold value used to determine whether the proposed filter depth ($d_n$) is much smaller than the previous filter depth ($d_{h-1}$) may be set to an integer, such as 3 or 4. For purposes of this explanation, we can assume the threshold value is 4. Any large difference between the proposed filter depth ($d_n$) and the previous filter depth ($d_{h-1}$) would not be reflected in a single filter depth adjustment for one sample. If the proposed filter depth ($d_n$) is less than the previous filter depth ($d_{h-1}$) by 4 or more, for example if the proposed filter depth ($d_n$) is 4 and the previous filter depth ($d_{h-1}$) is 8, the filter depth adjustment would instead be performed over three consecutive samples as opposed to one sample. This would occur if the pointer 104 is suddenly moved into close contact with the tablet surface. Specifically, the filter depth of 8 would be decreased at a first sample by a first decrement of 2 at step S206 because the proposed filter depth ($d_n$) 4 is determined to be much smaller than the previous filter depth ($d_{h-1}$) 8 at step S204 based on the threshold value. The filter depth of 6 would then be decreased again at a second sample by a second decrement of 1 at step S210 because the proposed filter depth ($d_n$) 4 is determined to be smaller (not much smaller) than the previous filter depth ($d_{h-1}$) 6 at step S208. The filter depth of 5 would then be decreased again at a third sample by a third decrement of 1 at step S210 because the proposed filter depth ($d_n$) 4 is determined to be smaller (not much smaller) than the previous filter depth ($d_{h-1}$) 5 at step S208. Accordingly, the proposed filter depth of 4 is obtained. On the other hand, if the proposed filter depth ($d_n$) is greater than the previous filter depth ($d_{h-1}$), the filter depth adjustment is performed in consecutive samples in repeated increments of 1 at step S202. For example, if the pointer 104 is suddenly moved away from the tablet surface 106 and the proposed filter depth ($d_n$) is 7 and the previous filter depth ($d_{h-1}$) is 4, the method of FIG. 7 increments the filter depth by one at each sample until the filter depth of 7 is obtained.

Thus, the method of adjusting filtering parameters shown in FIG. 7 assures that the filter parameter is gradually adjusted without dramatic changes, regardless of whether the relative height of the pointer 104 or relative jitter changes dramatically from sample to sample. As a result, there are no dramatic changes in the values of x', which represents the filtered position signal value.

Those skilled in the art will recognize that the jitter reducing apparatus 112 of FIG. 4 and the methods of FIGS. 4 and 7 can be applied to various other windowing filters, or used in conjunction with other classes of filters, such as adaptive finite impulse response filters, an example of which is described in U.S. Pat. No. 5,179,254.

It should be understood that various other methods can be used to calculate the jitter at a particular height or location with respect to the tablet surface 106. For example, instead of assuming that the jitter changes linearly with the height, it could be assumed that the jitter changes as the square of the height.

Alternatively, discrete measurements could be made at various heights with a particular class of pointers or tools, such as fingers or styluses, and used in a direct lookup table. In this case, the filter parameter adjustment unit 120 may include a memory in which various height values are associated with jitter values and/or filter parameter values. Thus, when the height value is determined, the filter parameter adjustment unit 120 retrieves the corresponding filter parameter value or jitter value and controls the filtering unit 118, accordingly.

It will be appreciated by one of ordinary skill in the art that the apparatus and methods of the various embodiments of the present invention, for example, the height adaptive filter, can be implemented in a host application or in a system level driver. Such driver may be implements as software or firmware and may be resident on in the tablet or the CPU of the host computer. Likewise, the filtering could be implemented in the tablet 102 itself, either as firmware of a processor or as a custom IC built specifically for the filtering unit 118. That is, the apparatus 112 of FIG. 4 and/or the methods of FIGS. 5 and 7 may be implemented by an integrated circuit in the tablet 102 or host computer to which the tablet 102 is connected. Alternatively, the apparatus 112 of FIG. 4 or the methods of FIGS. 5 and 7 may be embodied as computer readable codes on a computer readable recording medium running on the tablet 102 itself or as a system driver running on the host computer. The computer readable recording medium may be any data storage device that can store data which can be thereafter read by a computer system. Examples of the computer readable recording medium include read-only memory (ROM), random-access memory (RAM), CD-ROMs, flash memory, downloadable instructions, magnetic tapes, floppy disks, optical data storage devices, and carrier waves (such as data transmission through the Internet), among other things.

Additionally, it should be understood that the relative jitter function described above may be made dependent on measurements other than height. Such measurements could include, but would not be limited to, the coordinate(s) being measured, the perpendicular coordinate, or some other value, such as a direct measurement or approximation of interfering radiation and/or signal strength.

It should also be understood that the pointer 104 as defined herein may be a pointing device, such as a stylus, or a user's finger which may be electromagnetically or electrostatically coupled to the tablet 102. The pointer device 108 may be a graphics tablet, a digitizer tablet, or a touch tablet, which may be used for graphic design or other applications. It will also be appreciated that the tablet 102 may be integrated with the screen of a display device in a touch screen or tablet computer.

Although embodiments of the present invention have been shown and described, it will be appreciated by those skilled in the art that changes may be made in these embodiments without departing from the principles and spirit of the invention, the scope of which is defined in the appended claims and their equivalents.

We claim:

1. A method of reducing jitter over a range of tool heights above a surface of a pointing device, the method comprising the steps of:
   a. determining a height of a tool above a tablet surface of a tablet based on signal communication between the tool and the tablet;
   b. adjusting parameters of a jitter reduction filter based on the determined height;
   c. determining a position of the tool on the tablet surface;
   d. filtering the determined position of the tool by applying the adjusted jitter reduction filter; and
   e. reporting the filtered position.

2. The method of claim 1, including the step of: adjusting a depth of a rectangular filter.

3. The method of claim 2, wherein the step of adjusting the depth of the rectangular filter can only increase by one for each coordinate measurement.

4. The method of claim 2, wherein the step of adjusting the depth of the rectangular filter can only decrease by one or two for each coordinate measurement.

5. The method of claim 1, wherein the adjustment of the parameters of the jitter reduction filter comprises adjusting the parameters of a finite response filter.

6. The method of claim 1, wherein the signal communication comprises an independent electromagnet or electrostatic interaction between the tool and at least one electrode or sensor coil disposed on the tablet.

7. The method of claim 1, wherein the signal communication comprises detection of said height based on a strength of a signal transmitted between said tablet and said tool.

8. A method of stabilizing positional data in a digitizer tablet associated with a display device for reporting a position of a pointer, the method comprising the steps of:
   detecting a current location of the pointer with respect to a coordinate grid defined on the tablet and outputting a position signal indicative of the current pointer location;
   filtering noise from the position signal based on at least one filter parameter;
   determining a height of the pointer above a location on the tablet based on signal communication between the pointer and the tablet and estimating an amount of jitter in the position signal based on the determined height; and
   adjusting the at least one filter parameter based on the estimated amount of jitter.

9. The method of claim 8, including the step of filtering the noise from the position signal by applying a rectangular windowing filter to the position signal so that at each value of the position signal, the most recent N output position sample values are averaged to determine a current value of the position signal.

10. The method of claim 9, including the step of adjusting a window size (N) of the rectangular windowing filter.

11. The method of claim 8, including the step of detecting a current height of the pointer with respect to the tablet surface so that differences in signal strength based on different heights of the pointer are accounted for in the filtering operation.

12. The method of claim 8, wherein:
   the filtering comprises applying a moving average filter with a filter depth (d); and
   the adjustment of the at least one filter parameter comprises increasing the filter depth (d) when the amount of jitter is likely to increase and decreases the filter depth (d) when the amount of jitter is likely to decrease.

13. A method of stabilizing positional data in a digitizer tablet associated with a display device for reporting a position of a pointer, the method comprising the steps of:
   detecting a current location of the pointer with respect to a coordinate grid defined on the tablet and outputting a position signal indicative of the current pointer location;
   filtering noise from the position signal based on at least one filter parameter;
   determining a distance of the pointer from a location on the tablet and estimating an amount of jitter in the position signal based on the determined distance; and
   adjusting the at least one filter parameter based on the estimated amount of jitter,
   the filtering comprises applying a moving average filter with a filter depth (d); and
   the adjustment of the at least one filter parameter comprises increasing the filter depth (d) when the amount of jitter is likely to increase and decreases the filter depth (d) when the amount of jitter is likely to decrease, wherein the adjustment of the at least one filter parameter comprises:
- calculating a proposed filter depth based on the estimated amount of jitter;
- comparing the proposed filter depth to a previous filter depth to determine a difference therebetween;
- adjusting the previous filter depth by a first predetermined amount if the difference between the previous filter depth and the proposed filter depth is small;
- adjusting the previous filter depth by a second predetermined amount if the difference between the previous filter depth and the proposed filter depth is large, the second predetermined amount being greater than the first predetermined amount; and
- maintaining the previous filter depth if the previous filter depth is the same as the proposed filter depth.

14. A digitizer tablet for digitizing a position of a pointer, the digitizer tablet associated with a display device for reporting a position of the pointer, the digitizer tablet comprising:
- a position detecting unit defining an x-y coordinate grid on a surface of the tablet wherein an x-coordinate is perpendicular to a y-coordinate on said x-y coordinate grid, said position detecting unit including at least one sensing element for detecting a current location of the pointer with respect to the x-y coordinate grid and outputting a position signal indicative of the current pointer location;
- a filtering unit for filtering noise from the position signal based on at least one filter parameter;
- a jitter determining unit for determining a height of the pointer from a point on the tablet along a z-coordinate which is orthogonal to said x and y coordinates, and estimating an amount of jitter in the position signal based on the determined height; and
- a filter parameter adjustment unit for adjusting the at least one filter parameter of said filtering unit based on the amount of jitter estimated by the jitter determining unit.

15. The digitizer tablet of claim 14, wherein said filtering unit comprises a rectangular windowing filter.

16. The digitizer tablet of claim 15, wherein at each value of the position signal, said rectangular windowing filter averages the most recent N output position sample values to determine a current value of the position signal.

17. The digitizer tablet of claim 15, wherein the at least one filter parameter comprises a window size of said rectangular windowing filter.

18. The digitizer tablet of claim 14, wherein said filtering unit comprises an adaptive finite impulse response filter (FIR).

19. The digitizer tablet of claim 14, wherein said jitter determining unit comprises a height determination unit which detects a current height of the pointer with respect to the tablet surface and provides the current height of the pointer to the filter adjustment unit to account for differences in signal strength based on different heights of the pointer.

20. The digitizer tablet of claim 14, wherein:
- said filtering unit comprises a moving average filter with a filter depth (d); and
- said filter parameter adjustment unit increases the filter depth (d) when the amount of jitter in the position signal is likely to increase and decreases the filter depth (d) when the amount of jitter is likely to decrease in the position signal.

21. The digitizer tablet of claim 20, wherein said filter parameter adjustment unit adjusts the filter depth gradually thereby avoiding dramatic changes in the filtered position signal.

22. The digitizer tablet of claim 14, wherein the pointer comprises one or more of a stylus or a user finger.

23. A digitizer tablet for digitizing a position of a pointer, the digitizer tablet associated with a display device for reporting a position of the pointer, the digitizer tablet comprising:
- a position detecting unit defining a coordinate grid on a surface of the tablet, said position detecting unit including at least one sensing element for detecting a current location of the pointer with respect to the coordinate grid and outputting a position signal indicative of the current pointer location;
- a filtering unit for filtering noise from the position signal based on at least one filter parameter;
- a jitter determining unit for determining a distance of the pointer from a point on the tablet and estimating an amount of jitter in the position signal based on the determined distance; and
- a filter parameter adjustment unit for adjusting the at least one filter parameter of said filtering unit based on the amount of jitter estimated by the jitter determining unit;
- said filtering unit comprises a moving average filter with a filter depth (d); and
- said filter parameter adjustment unit increases the filter depth (d) when the amount of jitter in the position signal is likely to increase and decreases the filter depth (d) when the amount of jitter is likely to decrease in the position signal,
- wherein said filter adjustment unit calculates a proposed filter depth based on the amount of jitter, compares the proposed filter depth to a previous filter depth to determine a difference therebetween, adjusts the previous filter depth by a first predetermined amount if the difference between the previous filter depth and the proposed filter depth is small, adjusts the previous filter depth by a second predetermined amount greater than the first predetermined amount if the difference between the previous filter depth and the proposed filter depth is large, and maintains the previous filter depth if the previous filter depth is the same as the proposed filter depth.

24. A driver for operable association with a tablet pointing device, the driver containing executable instructions for instructing a computer to interact with the tablet pointing device, the executable instructions including a method of stabilizing positional data in the tablet pointing device, the driver comprising:
- executable instructions for detecting a current location of a pointer with respect to an x-y coordinate grid defined on the tablet pointing device wherein an x-coordinate is perpendicular to a y-coordinate on said x-y coordinate grid, and outputting a position signal indicative of the current pointer location;
- executable instructions for filtering noise from the position signal based on at least one filter parameter;
- executable instructions for determining a height of the pointer from a location on the tablet pointing device along a z-coordinate which is orthogonal to said x and y coordinates, and estimating an amount of jitter in the position signal based on the determined height; and
- executable instructions for adjusting the at least one filter parameter based on the estimated amount of jitter.

* * * * *